US012712310B2

(12) United States Patent
Ito et al.

(10) Patent No.: US 12,712,310 B2
(45) Date of Patent: Aug. 18, 2026

(54) CONNECTOR

(71) Applicant: Yazaki Corporation, Tokyo (JP)

(72) Inventors: Yasuaki Ito, Tokyo (JP); Masaki Imamura, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 347 days.

(21) Appl. No.: 18/605,945

(22) Filed: Mar. 15, 2024

(65) Prior Publication Data

US 2024/0339778 A1 Oct. 10, 2024

(30) Foreign Application Priority Data

Apr. 10, 2023 (JP) ................................ 2023-063227

(51) Int. Cl.
*H01R 13/50* (2006.01)
*H01R 13/422* (2006.01)

(52) U.S. Cl.
CPC ........... *H01R 13/50* (2013.01); *H01R 13/422* (2013.01); *H01R 2201/26* (2013.01)

(58) Field of Classification Search
CPC .. H01R 13/50; H01R 13/422; H01R 2201/26; H01R 31/08; H01R 13/4223; H01R 13/436; H01R 13/631; H01R 25/142; H01R 25/145
See application file for complete search history.

(56) References Cited

U.S. PATENT DOCUMENTS 5,707,254 A * 1/1998 Chishima ........... H01R 13/4223 439/721
9,054,442 B2 * 6/2015 Adachi ................ H01R 13/516
2025/0141145 A1 * 5/2025 Shimasaki ........... H01R 13/424

FOREIGN PATENT DOCUMENTS

JP 8-17531 A 1/1996
WO WO-2017150567 A1 * 9/2017 ........... H01R 9/2458

* cited by examiner

*Primary Examiner* — Seung H Lee
(74) *Attorney, Agent, or Firm* — Sughrue Mion, PLLC

(57) ABSTRACT

A connector includes a busbar including a base portion in a strip plate shape and a plurality of tab terminals extending from a predetermined position in a longitudinal direction of the base portion; and a housing including a busbar accommodation room in which the busbar is accommodated, wherein the busbar accommodation room includes a pair of plate portions for sandwiching and holding the base portion, the pair of plate portions are provided with a first protrusion and a second protrusion respectively, the first/second protrusion protruding toward each other and being contactable with the busbar, the first protrusion and the second protrusion are provided at shifted positions in an extending direction of the tab terminal, and the tab terminal is accommodated in the busbar accommodation room in a tilted state of being apart from the one side as advancing in the direction in which the tab terminal extends.

5 Claims, 8 Drawing Sheets

CONNECTOR

TECHNICAL FIELD

The present invention relates to a connector.

BACKGROUND ART

In a vehicle, various of electronic devices are equipped and wire harnesses are routed therein to transmit power and control signals to the electronic devices. The wire harness comprises a plurality of electric wires and a connector, and the wire harness is connected to another electronic device and another wire harness by fitting this connector to the connector of the electronic device and the connector of other wire harness.

Regarding a joint connector used in such a wire harness, the joint connector is configured to include a busbar in a substantially flat-plate shape forming a structure in which a plurality of tongue-shaped tab terminals (in a case of this example, two tongue-shaped tab terminals) are made to extend from a base plate portion in a flat strip shape and a connector housing configured to accommodate and hold this busbar (for example, referring to Patent Document 1).

In the connector housing, flat and narrow busbar retaining grooves to which the busbar is fitted and retained therein are provided in two rows on the rear end surface while an opening portion is provided at the front side so as to make each tab terminal of the busbar that is fitted to the busbar retaining groove to protrude into the opening portion. Also, a jig guide groove for inserting the busbar into the busbar retaining groove is configured on the rear end surface in the connector housing so as to be orthogonal to the busbar retaining groove.

In a case of assembling such joint connector, each tab terminal of the busbar is brought to approach and inserted into the busbar retaining groove, a busbar insertion jig is brought to approach the jig guide groove to press the base plate portion of the busbar. Accordingly, the busbar is fitted and retained in the busbar retaining groove, and the busbar is accommodated and held in the connector housing.

CITATION LIST

Patent Documents

[Patent Document 1] JP H8-17531A

SUMMARY OF THE INVENTION

Technical Problem

Regarding each tab terminal of the busbar in such a conventional joint connector, when inserted into the interior of a female connection terminal, it is concerned that each tab terminal strikes hard to the female connection terminal (connection object), and the insertion workability for the connection object of each tab terminal is poor.

An object of the present invention is to provide a connector with improved insertability for the connection object.

Solution to Problem

In order to solve the above-mentioned technical problem, a connector according to the present invention is provided to include a busbar including a base portion in a strip plate shape and a plurality of tab terminals extending from a predetermined position in a longitudinal direction of the base portion; and a housing including a busbar accommodation room in which the busbar is accommodated, wherein the busbar accommodation room includes a pair of plate portions which are provided to be opposite to each other in a plate thickness direction of the busbar and configured for sandwiching and holding the base portion, one side of the pair of plate portions is provided with a first protrusion protruding toward the other side of the pair of plate portions and being contactable with the busbar, the other side of the pair of plate portions is provided with a second protrusion protruding toward the one side of the pair of plate portions and being contactable with the busbar, the first protrusion and the second protrusion are provided at shifted positions in a direction in which the tab terminal extends, and the tab terminal is accommodated in the busbar accommodation room in a tilted state of being apart from the one side as advancing in the direction in which the tab terminal extends.

Effect of the Invention

According to the present invention, it is possible to improve the insertion workability for the connection object.

DESCRIPTION OF EMBODIMENTS

Figure 1:
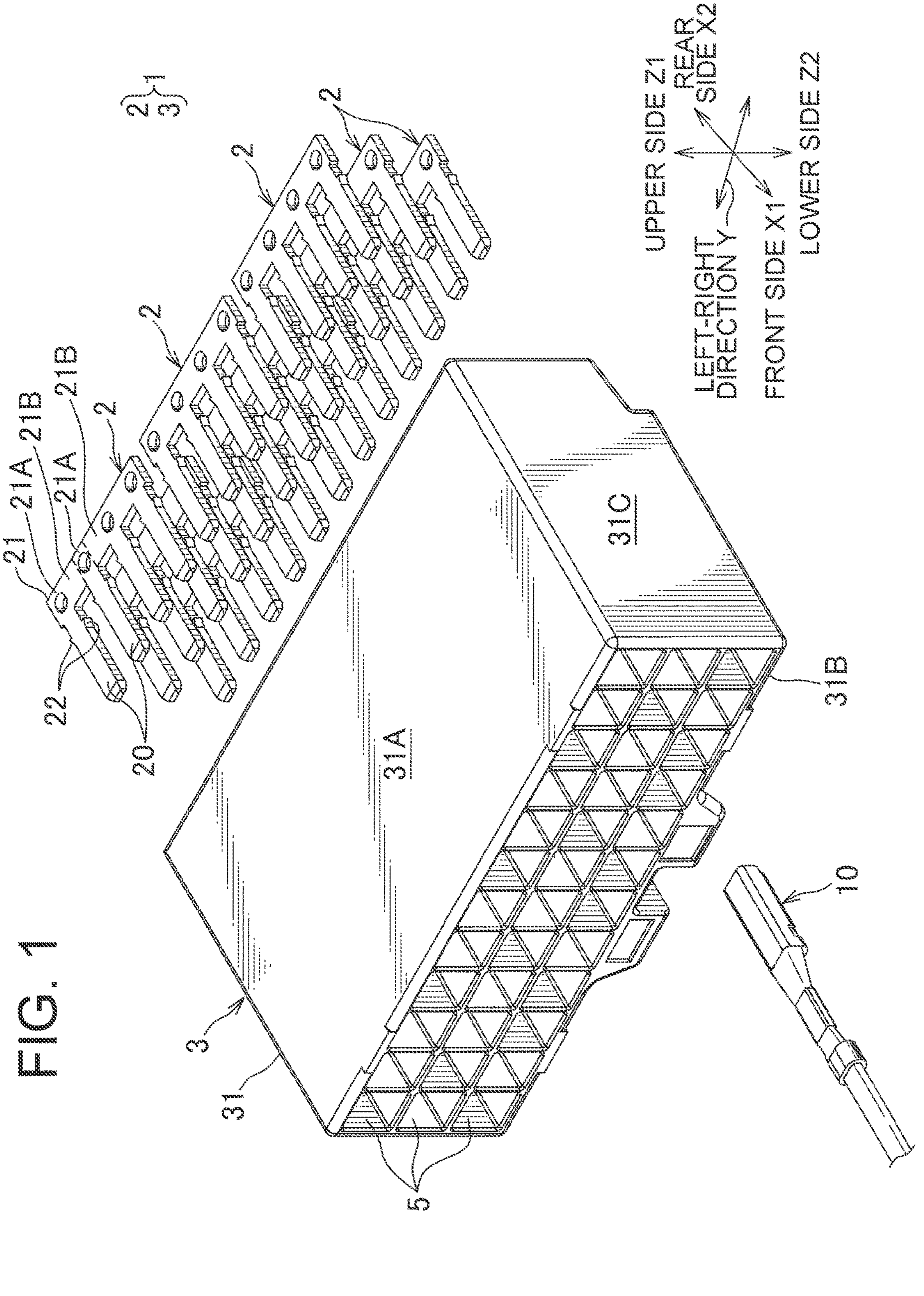
FIG. 1 is an exploded perspective view showing a connector according to an embodiment of the present invention.
Figure 2:
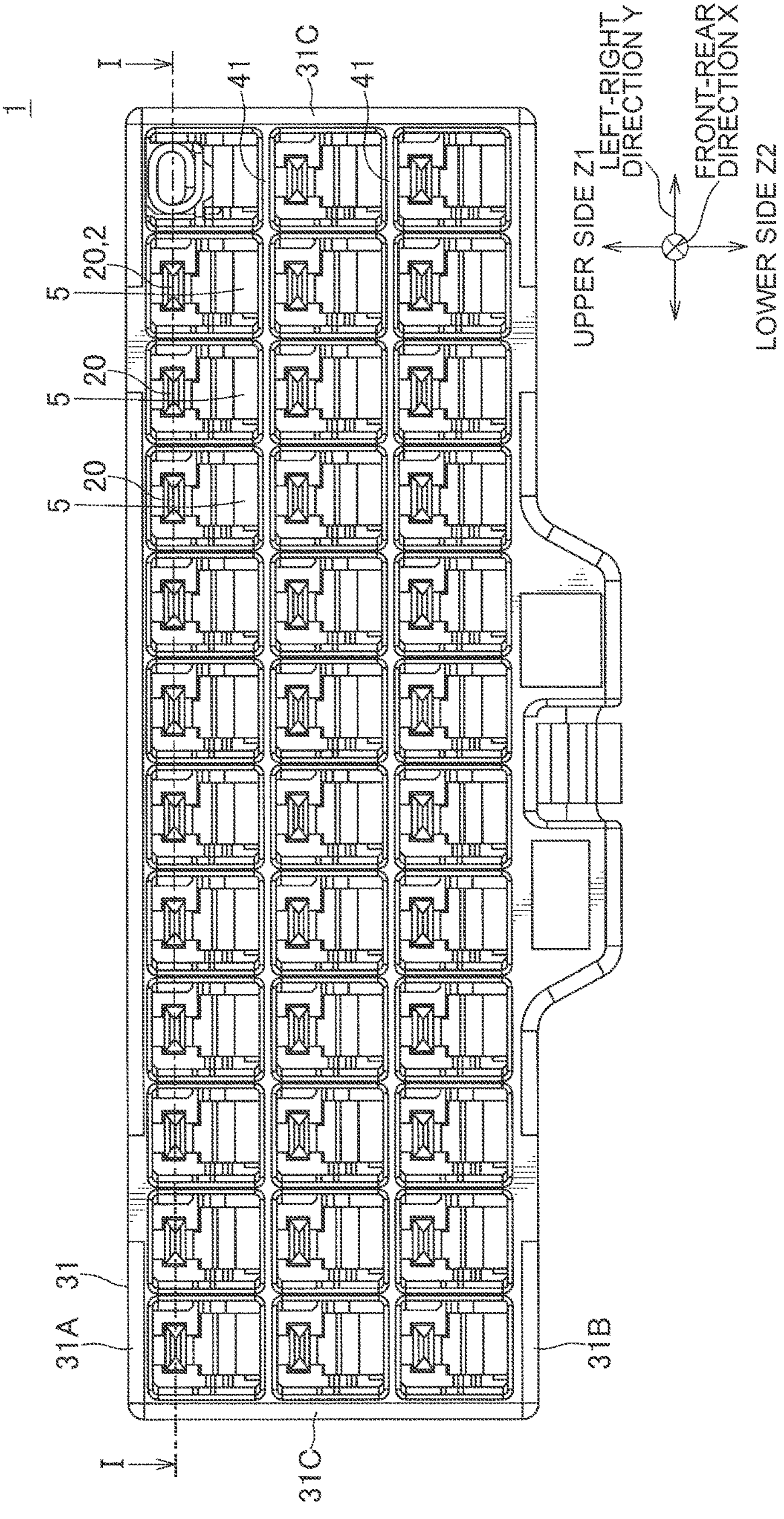
FIG. 2 is a planar view showing the above-described connector viewed from a front side.

An embodiment of the present invention will be described below with reference to FIG. 1 to FIG. 8. FIG. 1 is an exploded perspective view showing a connector 1 according to an embodiment of the present invention.

The connector 1 according to the present embodiment, as shown in FIG. 1 to FIG. 3B, comprises a plurality of busbars 2 having a plurality of tab terminals 20, and a housing 3 having busbar accommodation rooms 30 (shown in 3A and FIG. 3B) for accommodating the plurality of busbars 2 respectively. As shown in FIG. 1, the connector 1 is configured such that, in a state where the busbar 2 is accommodated in the busbar accommodation room 30, each tab terminal 20 is inserted and connected to a female terminal fitting 10 (shown in FIG. 1, and hereinafter recorded as a female terminal 10) as a connection object.

Figure 3A:
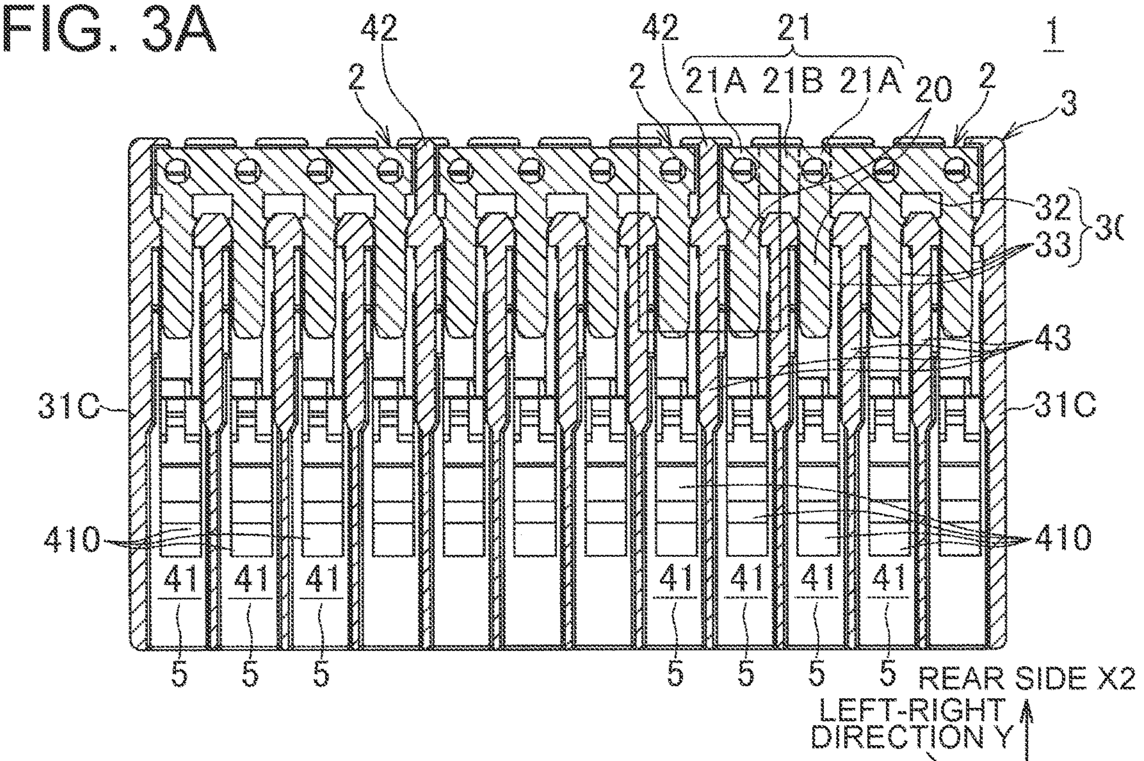
FIG. 3A is a cross-sectional view taken along a line I-I in FIG. 2.
Figure 3B:
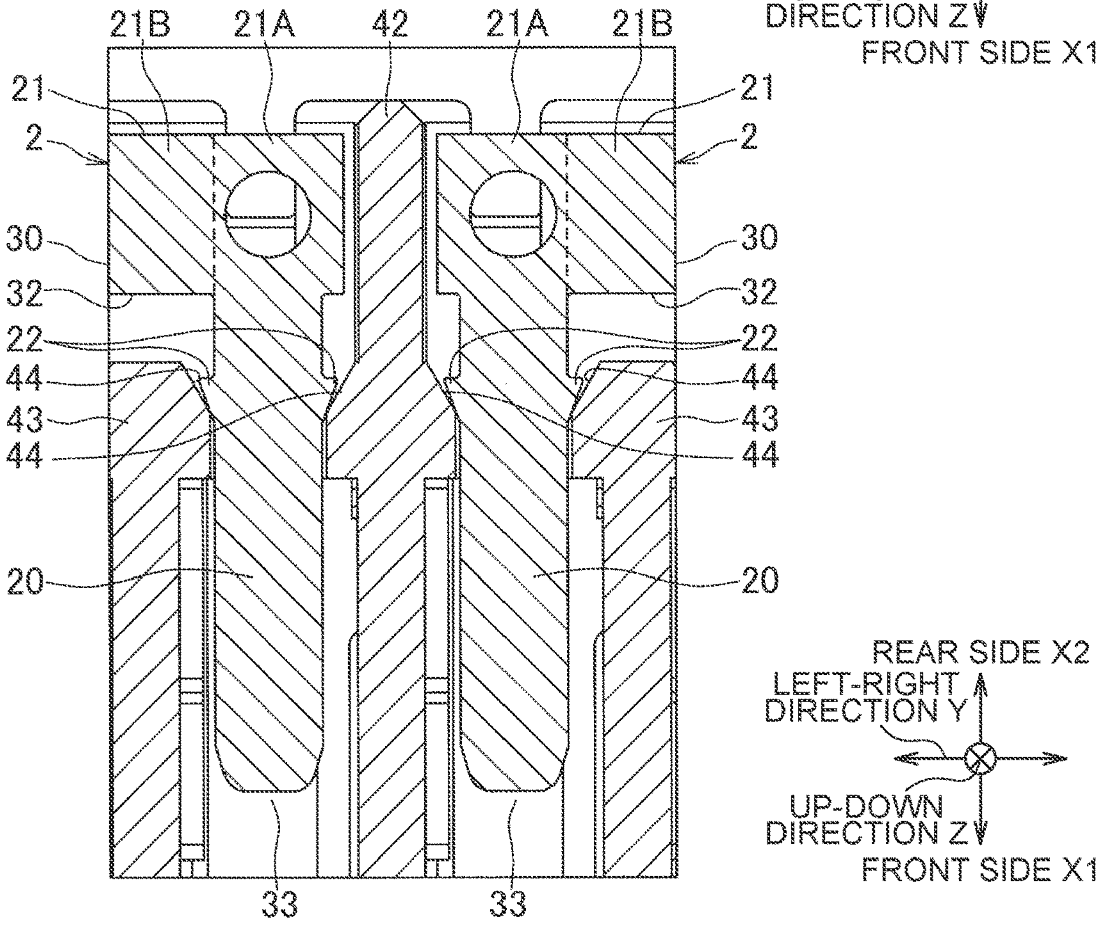
FIG. 3B is an enlarged view showing a main portion in FIG. 3A.

As shown in FIG. 1, FIG. 3A, and FIG. 3B, the busbar 2 is configured to integrally include a rectangular plate-shaped base portion 21, a plurality of tab terminals 20 extending in a front side X1 from a predetermined position in the left-right direction Y in the base portion 21 (longitudinal direction of the base portion 21).

The base portion 21 includes a plurality of first base portions 21A located on the rear side X2 of each tab terminals 20, and a second base portion 21B located between a pair of adjacent first base portions 21A. The dashed line in FIG. 1 and FIG. 3B indicates a border between first base portion 21A and second base portion 21B.

As shown in FIG. 1, FIG. 3A, and FIG. 3B, each tab terminal 20 is provided with a pair of extending pieces 22, 22 on both sides of the width direction Y. The pair of extending pieces 22, 22 are formed that a protrusion amount in the width direction Y gradually decreases as toward the front side X1. As shown in FIG. 3A and FIG. 3B, each tab terminal 20, when the busbar 2 is accommodated in the busbar accommodation room 30, is configured to come into contact with a displacement restriction portion 44 of an accommodation space configuration portion 4 described below so as to restrict a displacement of each tab terminal 20 in the width direction Y.

In the present embodiment, the direction in which each tab terminal 20 extends is recorded as a front-rear direction X, two directions being orthogonal to the front-rear direction X are recorded as a direction Y and a direction Z, respectively. In the front-rear direction X, there is a case in which the front-end side of each tab terminal 20 is recorded as the "front side X1", and the rear-end side being opposite to this is recorded as the "rear side X2". The direction Y is the width direction Y (there is a case in which the direction is recorded as the left-right direction Y) of the tab terminal 20, and the direction Z is the plate thickness direction Z (there is a case in which the direction is recorded as the up-down direction) of each tab terminal 20. There is a case in which one side in the plate thickness direction Z is recorded as the "upper side Z1", and the other side is recorded as the "lower side Z2".

The housing 3 is made of, for example, the insulating resin. As shown in FIG. 4A, FIG. 4B, FIG. 5A, FIG. 5B, the housing 3 includes a rectangular tube-shaped housing main body 31 with the front-rear direction X as an extending direction (axial direction of the cylinder), the accommodation space configuration portion 4 configured to partition the internal space of this housing main body 31, a plurality of busbar accommodation rooms 30 configured by the accommodation space configuration portion 4, and a plurality of female terminal accommodation rooms 5 (shown in FIG. 5A).

The housing main body 31, as shown in 4A, is configured to include an upper wall 31A, a lower wall 31B facing the lower side Z2 of the upper wall 31A, and a pair of side walls 31C, 31C facing each other in the left-right direction Y and being continuous with the upper wall 31A and lower wall 31B.

Figure 4A:
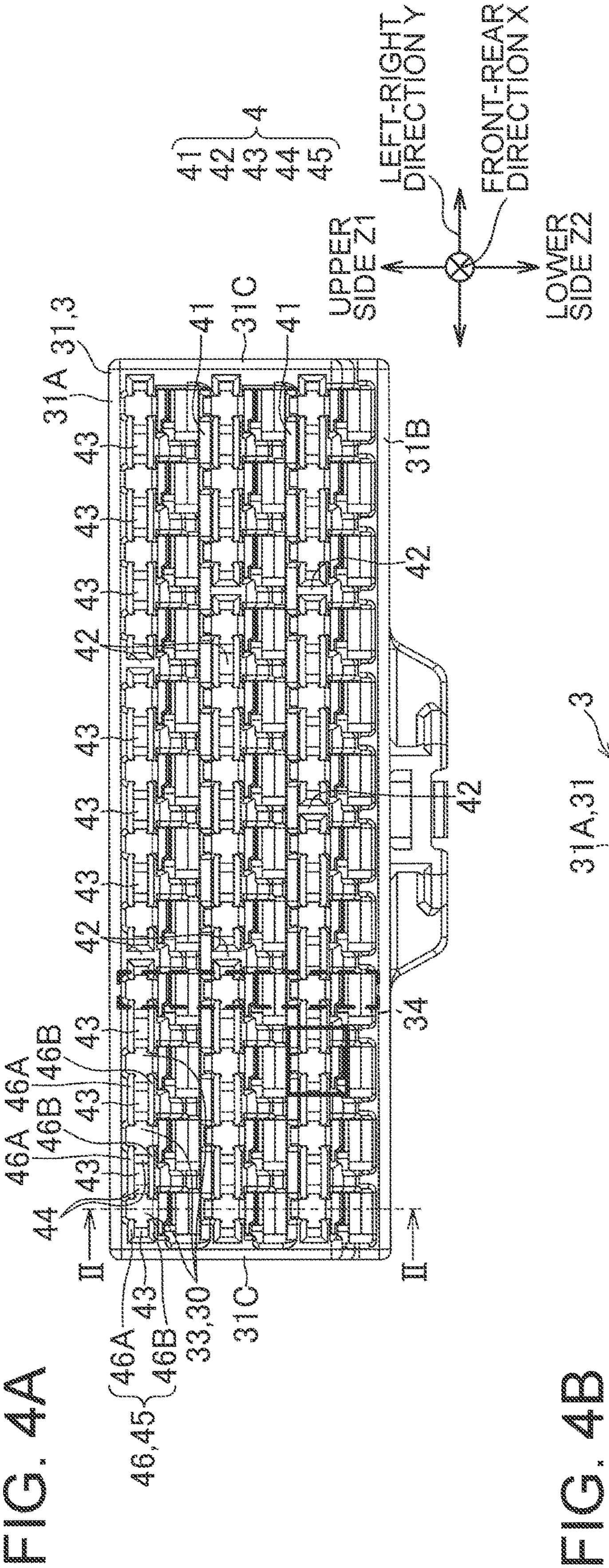
FIG. 4A is a planar view showing a housing configuring the connector when viewed from a rear side.
Figure 4B:
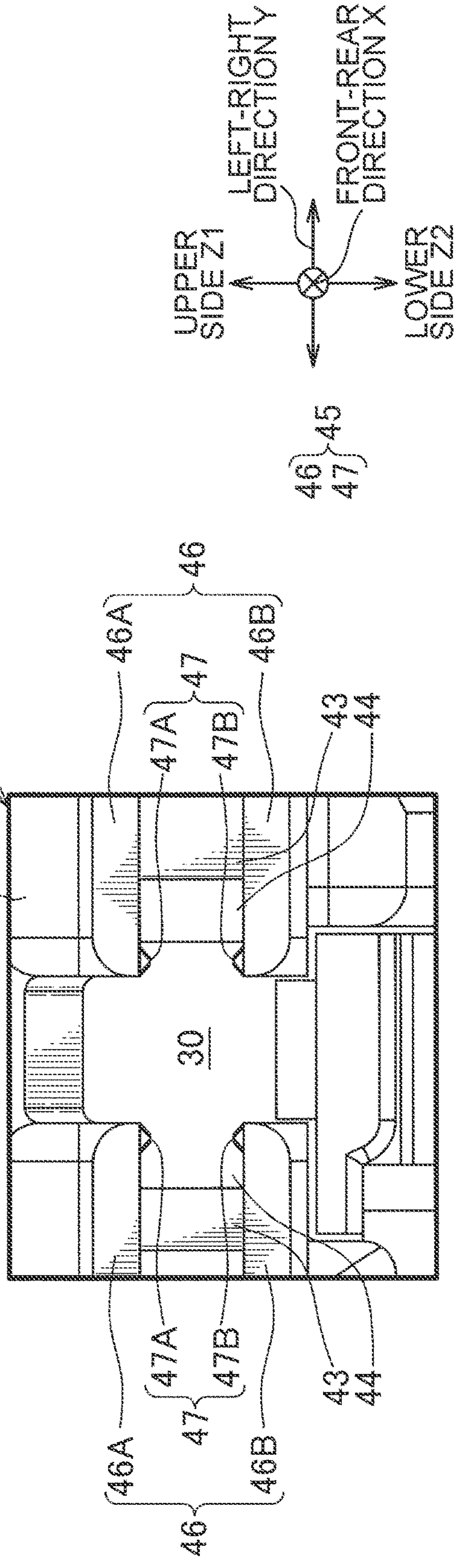
FIG. 4B is an enlarged view showing a main portion in FIG. 4A.

As shown in FIG. 4A and FIG. 4B, the accommodation space configuration portion 4 includes an up-down partition wall 41 (shown in FIG. 4A) configured to partition the housing main body 31 in the up-down direction Z, a partition wall 42 (shown in FIG. 4A) configured to insulate the busbars 2 from each other in the space being partitioned by this up-down partition wall 41, a left-right partition wall 43 configured to partition the plurality of tab terminal accommodation rooms 33 described below that are provided in each busbar accommodation room 30 from each other in the space being partitioned by this partition wall 42, a displacement restriction portion 44 configured to restrict the displacement of the busbar 2 provided in each busbar accommodation room 30, and a tilting restriction portion 45 configured to restrict the tilting of the busbar 2 provided in each busbar accommodation room 30.

According to the present embodiment, as shown in FIG. 4A, two of the up-down partition wall 41 are provided, and the housing main body 31 is partitioned into three spaces in the up-down direction Z by the up-down partition wall 41. Each up-down partition wall 41 is provided to extend on a plane including the front-rear direction X and the left-right direction Y.

Figure 5A:
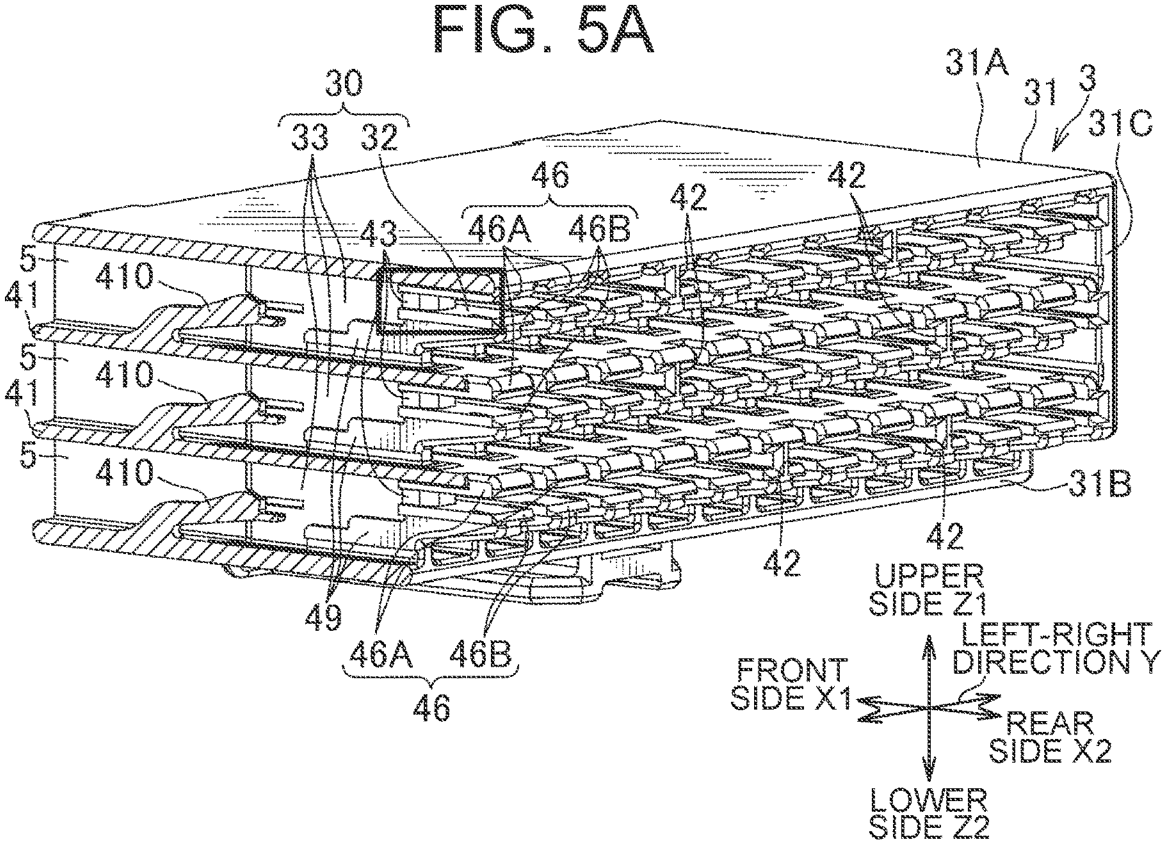
FIG. 5A is a perspective view showing a partial cross sectional taken along a line II-II in FIG. 4A.

Also, as shown in FIG. 5A, the up-down partition wall 41 (and the lower wall 31B of the housing main body 31) is provided with a lance 410 configured to retain the female terminal 10 accommodated in the female terminal accommodation room 5. The lance 410 is provided one for each female terminal accommodation room 5. Also, in a natural state, the lance 410 is formed to extend in an obliquely upper side Z1 as toward the rear side X2 of each female terminal accommodation room 5. Such lance 410 is provided on the lower side Z2 (the other side) in the female terminal accommodation room 5 to press the female terminal 10 in the upper side Z1 (one side).

As shown in FIG. 5A, the partition wall 42 is continuously provided on the lower side Z2 of the upper wall 31A of the housing main body 31 (or the up-down partition wall 41) while being provided to extend in a planar shape including the front-rear direction X and the up-down direction Z. A rear end of the partition wall 42, in a state in which the busbar 2 is accommodated in the busbar accommodation room 30 described below, is configured to be positioned at the rear side X2 with respect to the rear end of the busbar 2. That is, the rear end of the partition wall 42 is configured to protrude to the rear side X2 further from the rear end of the busbar 2.

As shown in FIG. 4A, FIG. 4B, FIG. 5A, FIG. 5B, the left-right partition wall 43 is continuously provided on the lower side Z2 of the upper wall 31A of the housing main body 31 (or the up-down partition wall 41) while being provided to extend in a planar shape including the front-rear direction X and the up-down direction Z. A rear end of the left-right partition wall 43, in a state in which the busbar 2 is accommodated in the busbar accommodation room 30 described below, is configured to be positioned at the front side X1 of the front end of the base portion 21 and at the rear side X2 of the front end of each tab terminal 20.

A shown in FIG. 3B, the displacement restriction portion 44 is provided in the partition wall 42 and the left-right partition wall 43 while being provided at the position in contact with the pair of extending pieces 22, 22 provided in each tab terminal 20 in the state in which each busbar 2 is accommodated in the busbar accommodation room 30 described below. Also, the displacement restriction portion 44 is formed that the protrusion amount in the left-right direction Y increases as toward the front side X1, and the displacement restriction portion 44 is configured to restrict the displacement of each tab terminal 20 in the left-right direction Y so as to position each tab terminal 20 at the predetermined position in the left-right direction Y at the time when coming into contact with the pair of extending pieces 22, 22.

As shown in FIG. 4B, the tilting restriction portion 45 includes a clamping portion 46 configured to sandwich and hold at least the second base portion 21B in the busbar 2 therebetween, and a tilting restriction protrusion 47 provided in the clamping portion 46 and configured to restrict the tilting of each tab terminals 20.

As shown in FIG. 4A, FIG. 4B, the clamping portion 46 is provided in a plural (in the same number as that of the left-right partition wall 43). The plurality of clamping portions 46 are apart from each other with a space (hereinafter there is a case of being recorded as the jig guide groove 34) formed in the left-right direction Y.

Each clamping portion 46 is formed in a flat plate shape, and is configured to have a pair of plate portion 46A, 46B. The pair of plate portion 46A, 46B are provided to face each other in the up-down direction Z. Each plate portion 46A, 46B is provided to extend on a plane including the front-rear direction X and the left-right direction Y.

Figure 7A:
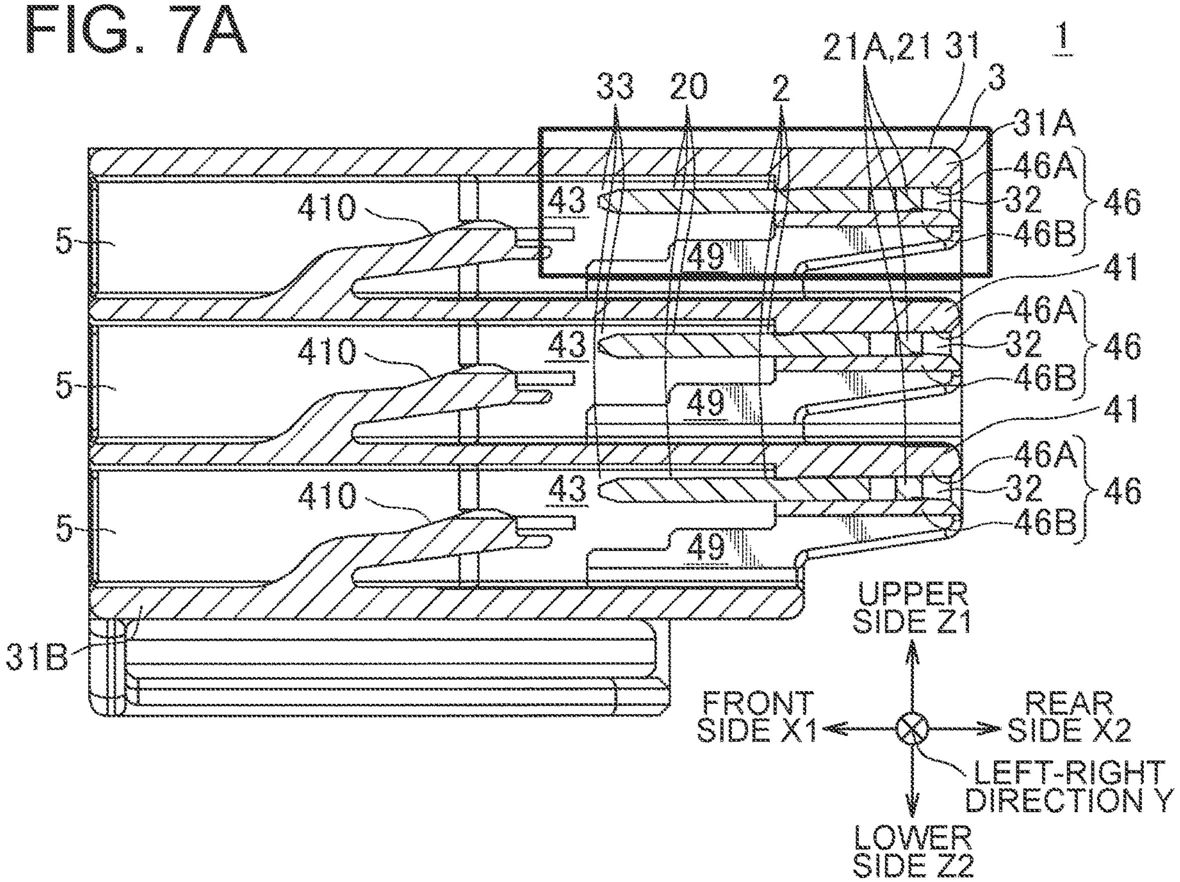
FIG. 7A is a longitudinal cross-sectional view of the connector.
Figure 7B:
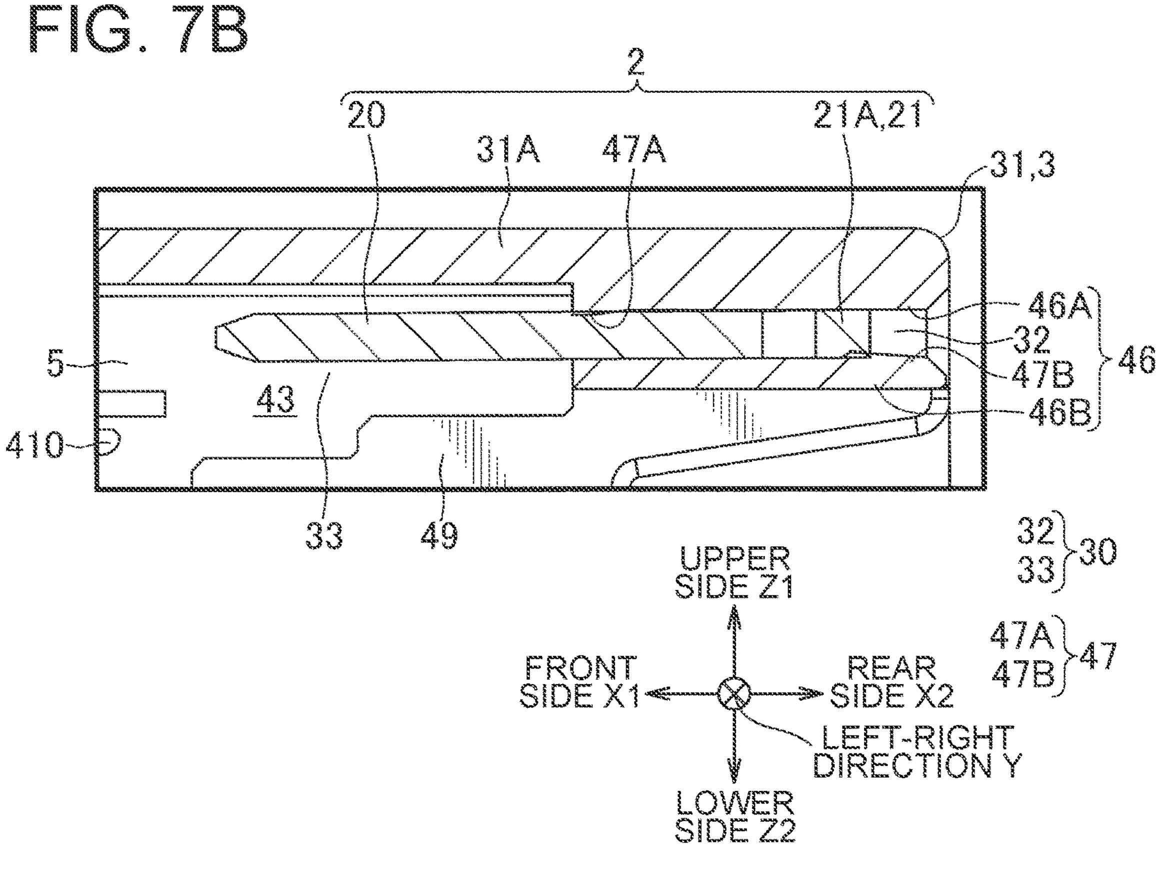
FIG. 7B is an enlarged view showing a main portion in FIG. 7A.

Also, as shown in FIG. 7A and FIG. 7B, the dimensions of each plate portion 46A, 46B in the front-rear direction X is formed to be larger than the dimension of the base portion 21 of the busbar 2 in the front-rear direction X, while in the state in which each busbar 2 is accommodated in each corresponding busbar accommodation room 30, the front end of each plate portion 46A, 46B is positioned at the front side X1 than the rear end of each tab terminal 20, and the rear end of each plate portion 46A, 46B is positioned at the rear side X2 than the rear end of the base portion 21. Also, as shown in FIG. 4B, the dimensions of each plate portion 46A, 46B in the left-right direction Y is formed to be larger than a separation dimension of the adjacent tab terminals 20 in the busbar 2 and each of the pair of plate portions 46A, 46B being adjacent to each other is in contact with an end edge of the tab terminal 20.

Hereinafter, one of the pair of plate portions 46A, 46B at the upper side Z1 is referred to as a "first plate portion 46A", and the other one of the pair of plate portions 46A, 46B at the lower side Z2 is referred to as a "second plate portion 46B". Also, the first plate portion 46A is provided between the upper wall 31A of the housing main body 31 (or the up-down partition wall 41) and the left-right partition wall 43, and the second plate portion 46B is provided continuously to a standing wall 49 standing from the partition wall 42 (or the lower wall 31B of the housing main body 31).

The tilting restriction protrusion 47 includes, as shown in FIG. 4A and FIG. 4B, a pair of first protrusions 47A, 47A provided in the first plate portion 46A, and a pair of second protrusions 47B, 47B provided in the second plate portion 46B. As shown in FIG. 4B, FIG. 7A and FIG. 7B, the pair of first protrusions 47A, 47A are provided in both end portions in the left-right direction Y respectively in the front-end portion of the first plate portion 46A, and the pair of second protrusions 47B, 47B are provided in both end portions in the left-right direction Y respectively in the rear-end portion of the second plate portion 46B.

As shown in FIG. 7B, the first protrusion 47A is provided to protrude from the lower surface of the first plate portion 46A to the lower side Z2, and the second protrusion 47B is provided to protrude from the upper surface of the second plate portion 46B to the upper side Z1. According to the present embodiment, the second protrusion 47B is configured that a protrusion amount becomes larger (becomes higher) than that of the first protrusion 47A. By providing such tilting restriction protrusion 47, the tab terminal 20 is configured to be accommodated in the busbar accommodation room 30 so as to be apart from the upper side Z1 (one side) as advancing in the extending direction (front side X1), that is, in a state of tilting to the lower side Z2.

Figure 5B:
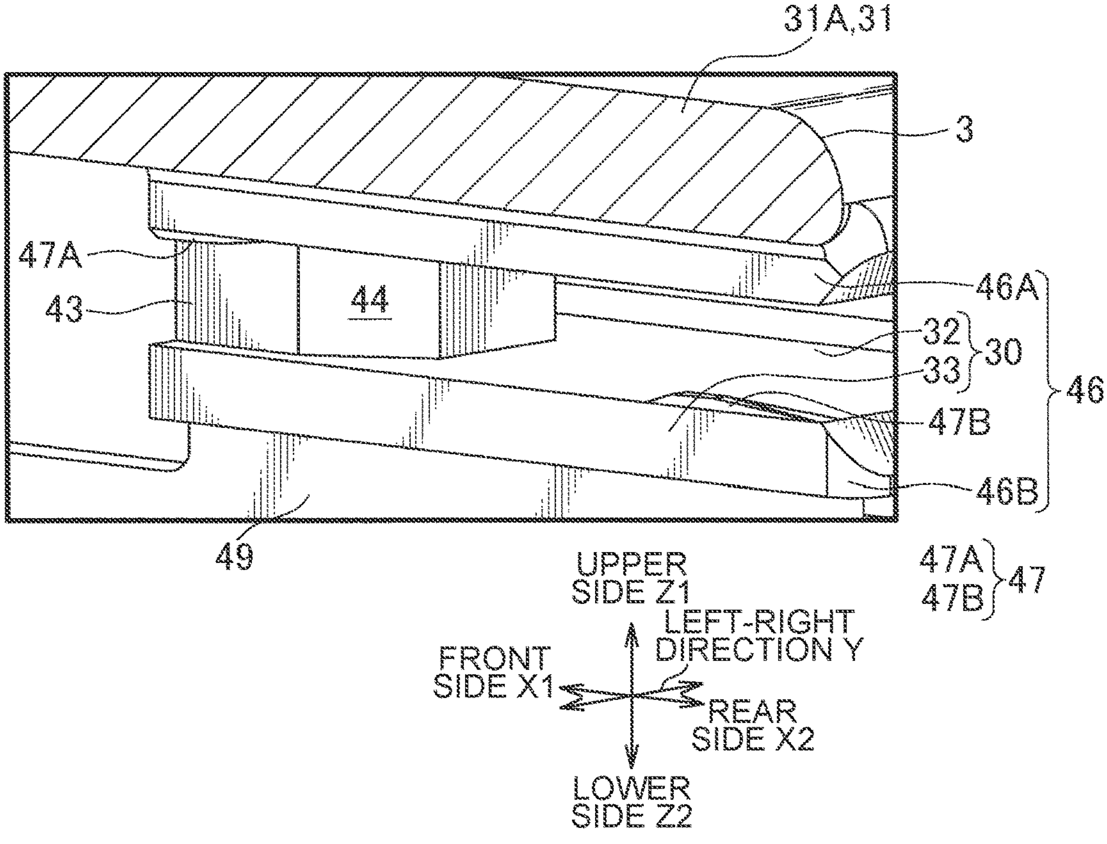
FIG. 5B is an enlarged view showing a main portion in FIG. 5A.

As shown in FIG. 5A and FIG. 5B, the plurality of busbar accommodation rooms 30 are configured that each busbar 2 is accommodated in each busbar accommodation room 30. As shown in FIG. 5A and FIG. 5B, each busbar accommodation room 30 includes a base portion accommodation room 32 in which the base portion 21 is accommodated, and a plurality of tab terminal accommodation rooms 33 in which each tab terminal 20 is accommodated. The base portion accommodation room 32 is provided at the rear side X2 of each tab terminal accommodation room 33 while being continuously provided in the left-right direction Y.

Each tab terminal accommodation room 33 is continuously provided in the front side X1 from a predetermined position in the left-right direction Y of the base portion accommodation room 32. Also, each tab terminal accommodation room 33 is provided to extend in the front-rear direction X so as to be able to accommodate each tab terminal 20.

As shown in FIG. 5A and FIG. 5B, the plurality of female terminal accommodation rooms 5 are provided side by side in the left-right direction Y. Also, each female terminal accommodation room 5 is provided to extend in the front-rear direction X so as to be able to accommodate each female terminal 10. That is, each female terminal accommodation room 5 and each tab terminal accommodation room 33 are provided side by side in a straight line while each female terminal accommodation room 5 is provided at the front side X1 of each tab terminal accommodation room 33.

When the female terminal 10 is inserted into such female terminal accommodation room 5, the female terminal 10 abuts and the lance 410 is bent temporarily, and when the insertion is further advanced and the female terminal 10 reaches a proper position, the lance 410 is restored, the female terminal 10 is retained, and the female terminal 10 is adapted to be accommodated in the female terminal accommodation room 5. Also, in a state in which the female terminal 10 is accommodated in each female terminal accommodation room 5, each busbar 2 is accommodated in each busbar accommodation room 30 while each tab terminal 20 is inserted into each tab terminal accommodation room 33 such that the female terminal 10 and the tab terminal 20 is electrical connected with each other.

Furthermore, as shown in FIG. 4A and FIG. 4B, the jig guide groove 34 in which a pushing portion 61 of the assembly jig 6 to be described below is inserted is provided in the housing 3. The jig guide groove 34, in the left-right direction Y, is positioned between the adjacent clamping portions 46 and is formed of a space into which the pushing portion 61 of the assembly jig 6 described below is inserted.

Figure 6:
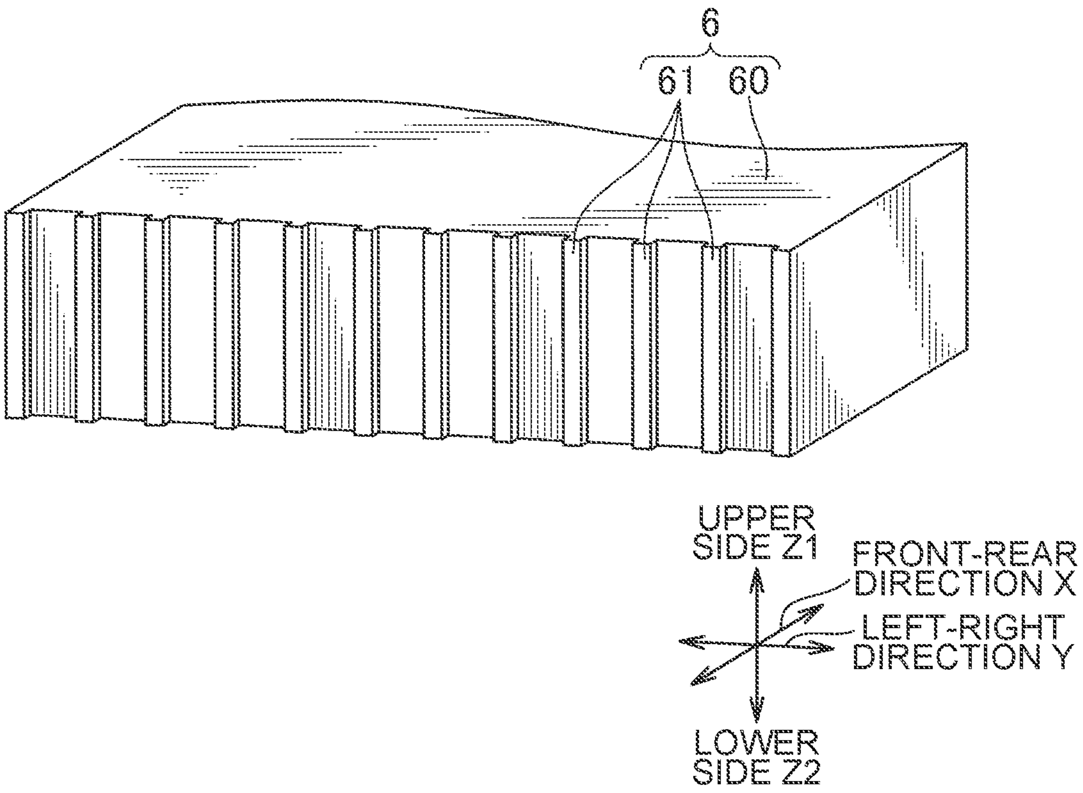
FIG. 6 is a perspective view showing an assembly jig for assembling the connector.

Furthermore, as shown in FIG. 6, the connector 1 includes the assembly jig 6 for assembling the connector 1 by pushing each busbar 2 to each busbar accommodation room 30. The assembly jig 6 includes a jig main body 60 in a rectangular parallelepiped shape, and the pushing portions 61 provided to protrude from the jig main body 60 in the front side X1. The pushing portions 61 are provided on the protrusions extending in the up-down direction Z and provided at intervals in the left-right direction Y so as to correspond to the jig guide grooves 34 provided in the housing 3.

In a case of assembling such connector 1, the front end of each tab terminal 20 of each busbar 2 is brought to approach the rear end of each busbar 30 and be inserted therein in a state in which the female terminal 10 is accommodated in the female terminal accommodation room 5 in advance. Here, the pushing portions 61 of the assembly jig 6 are brought to approach the jig guide grooves 34 and the assembly jig 6 is pushed to the housing 3. In this manner, the insertion is further advanced and each tab terminal 20 is in contact with the second protrusion 47B and the first protrusion 47A in this sequence, while the busbar 2 enters the state in which the front end of each tab terminal 20 is tilted toward the lower side Z2. The insertion is further advanced that each extending piece 22 of each tab terminal 20 comes into contact with the displacement restriction portion 44 of the busbar accommodation room 30 such that the displacement of each busbar 2 in the left-right direction Y is restricted. Also, each tab terminal 20 is inserted to the inside of the female terminal 10 in the state in which the front end of the tab terminal 20 is tilted toward the lower side Z2 and the female terminal 10 is electrically connected with each tab terminal 20. In this manner, the busbar 2 is accommodated in the busbar accommodation room 30. In this manner, the connector 1 is assembled.

Figure 8:
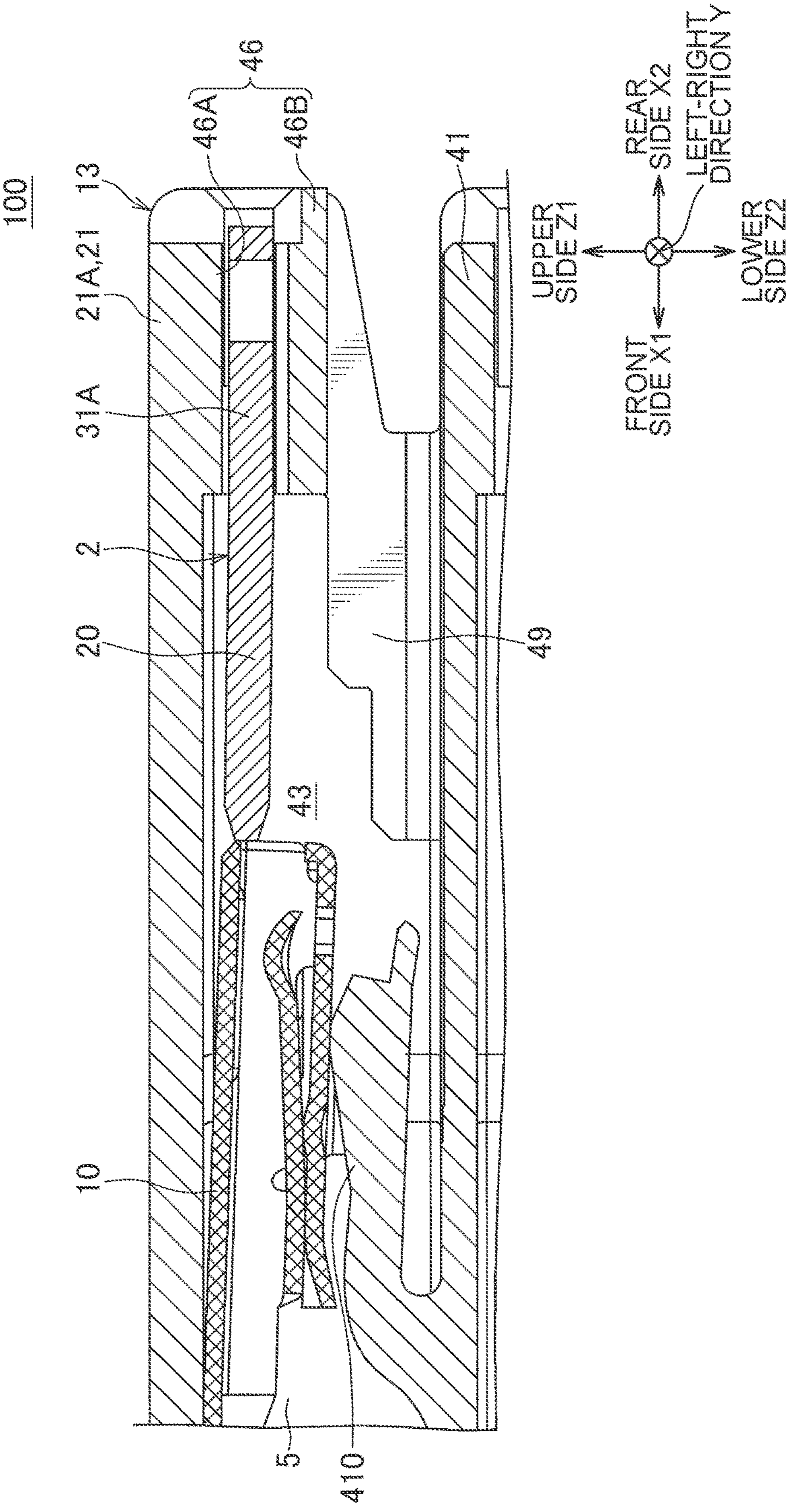
FIG. 8 is a view for describing a technical problem of the present embodiment.

Subsequently, the effect of the present embodiment will be described with reference to FIG. 7A, FIG. 7B and FIG. 8. FIG. 7A is a longitudinal cross-sectional view of the connector 1 according to the present embodiment, FIG. 7B is an enlarged view showing a main portion of FIG. 7A. FIG. 8 is a view showing a connector 100 without employing the tilting restriction projection 47 of the present embodiment. The connector 100 shown in FIG. 8 does not have the first protrusion 47A and the second projection 47B. Therefore, inside each busbar accommodation room 30 of the housing 13, there is a case in which the busbar 2, that is, the tab terminal 20 is brought into contact (strikes) with the end edge of the female terminal 10 in the state in which the front end of the tab terminal 20 is tilted to the upper side Z1, and each tab terminals 20 is not inserted to the inside of the female terminal 10, according to the present embodiment, the tab terminal 20 is accommodated in the busbar accommodation room 30 in the state of being tilted to separate from the first plate portion 46A (one side) as advancing in the front side X1 (extending direction of tab terminal 20).

Here, inside the female terminal accommodation room 5, the female terminal 10 is pushed to the upper side Z1 (one side) by the lance 410 that each busbar 2, that is, the front end of the tab terminal 20 is held in the posture of tilting to the lower side Z2 such that each tab terminal 20 is inserted to the inside of the female terminal 10 while preventing each tab terminal 20 from striking the inside of the female terminal 10. Accordingly, it is possible to secure the safety when inserting each tab terminal 20 to the inside of the female terminal 10 and improve the insertion workability.

Also, the first protrusion 47A is provided at the front-end side of the tab terminal 20 with respect to the second protrusion 47B. According to this arrangement, the configuration in which each busbar 2, that is, the front end of the tab terminal 20 is held in a posture of tilting to the lower side Z2 is realized.

Also, the pair of plate portions 46A, 46B are provided on both sides of the left-right direction Y (longitudinal direction of the base portion 21) in the tab terminal 20, the first protrusion 47A and the second protrusion 47B are provided side by side in the front-rear direction X (extending direction of tab terminal 20), the first protrusion 47A abuts the tab terminal 20, and the second protrusion 47B abuts the base portion 21. According to this configuration, by the first protrusion 47A and the second protrusion 47B, each busbar 2, that is, the front end of the tab terminal 20 is held in a more stable state in the posture of tilting to the lower side Z2. Accordingly, it is possible that each tab terminal 20 is inserted to the inside of the female terminal 10 while further preventing each tab terminal 20 from striking the inside of the female terminal 10 and thus further improving the insertion workability.

Also, the female terminal 10 connected to the tab terminal 20 is provided, the housing 3 includes the female terminal accommodation room 5 in which the female terminal 10 is accommodated, the lance 410 for retaining the female terminal 10 is provided at the lower side Z2 (the other side) in the female terminal accommodation room 5, and the female terminal 10 is accommodated at the upper side Z1 (one side) of the lance 410. According to this configuration, each busbar 2, that is, the front end of the tab terminal 20 is held in the posture of tilting to the lower side Z2 such that each tab terminal 20 is inserted to the inside of the female terminal 10 while preventing each tab terminal 20 from striking the inside of the female terminal 10.

The present invention is not limited to the above-described embodiment, and the modifications or the like shown below, including other configurations and the like in which the object of the present invention can be achieved, are also included in the scope of the present invention.

According to the above-described embodiment, the second protrusion 47B is configured to have the protrusion amount larger (higher) than that of the first protrusion 47A; however, the present invention is not limited to this configuration. For example, the first protrusion 47A may be configured to have the protrusion amount larger (higher) than that of the second protrusion 47B, and in this case, the first plate portion 46A and the second plate portion 46B may be configured to have a tapered shape, and the tab terminal 20 only has to be accommodated in the busbar accommodation room 30 in the state in which the tab terminal 20 separates from the first plate portion 46A (one side) as advancing in the front side X1 (extending direction of tab terminal 20).

According to the above-described embodiment, the first protrusion 47A is configured to be provided on the front-end side of the tab terminal 20 with respect to the second protrusion 47B, however, the present invention is not limited to this configuration. The first protrusion 47A may be provided at the rear end side of the tab terminal 20 with respect to the second protrusion 47B.

In addition, although the best configuration, method and the like for carrying out the present invention have been disclosed in the above description; however, the present invention is not limited thereto. That is, the present invention is specifically illustrated and described with respect to a particular embodiment, however, it is possible for a person with ordinary skill in the art to make various modifications to the embodiment described above in the detailed configuration of shapes, materials, quantities, and the like without departing from the technical scope and objectives of the present invention. Therefore, the description limiting the shape, material, and the like disclosed above is exemplified for facilitating understanding of the present invention, and since it is not intended to limit the present invention, the description in the name of member excluding the limitations of the shape, material, and the like in part or all, should also be included in the scope of the present invention.

REFERENCE SIGNS LIST

1 connector
2 busbar
20 plurality of tab terminals
21 base portion
3 housing

30 busbar accommodation room
46A, 46B pair of plate portions
46A first plate portion (one side of pair of plate portions)
46B second plate portion (other side of pair of plate portions)
47A first protrusion
47B second protrusion
410 lance
5 female terminal accommodation room
10 female terminal
arrow X tab terminal extending direction
arrow Y longitudinal direction of base portion
arrow Z plate thickness direction of busbar
arrow Z1 upper side (one side)
arrow Z2 lower side (other side)

What is claimed is:

1. A connector, comprising:

a busbar including a base portion in a strip plate shape and a plurality of tab terminals extending from a predetermined position in a longitudinal direction of the base portion; and a housing including a busbar accommodation room in which the busbar is accommodated, wherein the busbar accommodation room includes a pair of plate portions which are provided to be opposite to each other in a plate thickness direction of the busbar and configured for sandwiching and holding the base portion, one side of the pair of plate portions is provided with a first protrusion protruding toward the other side of the pair of plate portions and being contactable with the busbar, the other side of the pair of plate portions is provided with a second protrusion protruding toward the one side of the pair of plate portions and being contactable with the busbar, the first protrusion and the second protrusion are provided at shifted positions in a direction in which the tab terminal extends, and the tab terminal is accommodated in the busbar accommodation room in a tilted state of being apart from the one side as advancing in the direction in which the tab terminal extends.

2. The connector according to claim 1, wherein the first protrusion is provided at a front-end side of the tab terminal with respect to the second protrusion.

3. The connector according to claim 2, wherein the pair of plate portions are provided at both sides of the longitudinal direction of the base portion in the tab terminal, the first protrusion and the second protrusion are provided side by side in the direction in which the tab terminal extends, the first protrusion comes into contact with the tab terminal, and the second protrusion comes into contact with the base portion.

4. The connector according to claim 1, wherein the pair of plate portions are provided at both sides of the longitudinal direction of the base portion in the tab terminal, the first protrusion and the second protrusion are provided side by side in the direction in which the tab terminal extends, the first protrusion comes into contact with the tab terminal, and the second protrusion comes into contact with the base portion.

5. The connector according to claim 1, further comprises a female terminal connected to the tab terminal, wherein the housing includes a female-terminal accommodation room in which the female terminal is accommodated, a lance configured to retain the female terminal is provided at the other side in the female-terminal accommodation room, and the female terminal is accommodated at the one side of the lance.

* * * * *